United States Patent [19]

Itani

[11] Patent Number: 5,675,639

[45] Date of Patent: Oct. 7, 1997

[54] VOICE/NOISE DISCRIMINATOR

[75] Inventor: Tarek Adnan Itani, Plano, Tex.

[73] Assignee: InterVoice Limited Partnership, Reno, Nev.

[21] Appl. No.: 322,062

[22] Filed: Oct. 12, 1994

[51] Int. Cl.$^6$ .................................................. H04M 1/00
[52] U.S. Cl. ............................ 379/351; 379/386; 381/46
[58] Field of Search ............................ 379/351, 386; 381/46, 43, 42, 41

[56] References Cited

U.S. PATENT DOCUMENTS

| | | | |
|---|---|---|---|
| 4,052,568 | 10/1977 | Jankowski | 381/46 |
| 4,057,690 | 11/1977 | Vagliani et al. | 381/46 |
| 4,351,983 | 9/1982 | Crouse et al. | 381/46 |
| 4,827,519 | 5/1989 | Fujimoto et al. | 381/42 |
| 4,829,563 | 5/1989 | Crockett et al. | |
| 4,833,713 | 5/1989 | Muroi et al. | 381/43 |
| 4,979,214 | 12/1990 | Hamilton | 381/46 |
| 4,982,341 | 1/1991 | Laurent | 364/517 |
| 5,247,569 | 9/1993 | Cave | 379/113 |
| 5,311,588 | 5/1994 | Polcyn et al. | |
| 5,325,425 | 6/1994 | Novas et al. | 379/100 |

*Primary Examiner*—Ahmad F. Matar
*Assistant Examiner*—Gloria Tebchuani
*Attorney, Agent, or Firm*—Fulbright & Jaworski L.L.P.

[57] ABSTRACT

A system and method for recognizing a voice signal on a telecommunications path upon initiation of an outbound telephone call or receipt of an inbound call by an automated calling system. Power magnitudes of a received signal on the telecommunications path are measured over selected increments of time. Calculations are made to measure the variation in power measured with respect to the selected increments of time, and these calculations are then compared to a threshold value for determining whether or not the received signal is a voice signal.

21 Claims, 8 Drawing Sheets

VOICE/NOISE DISCRIMINATOR

TECHNICAL FIELD OF THE INVENTION

The present invention relates in general to communications systems, and more particularly, to a system and method for recognizing voice signals on a telecommunications path coupled to a communications system.

BACKGROUND OF THE INVENTION

In modern communication technology it is very important to be able to electronically detect the progress of a calling connection. One reason this is important is so that in automatic systems, particularly predictive dialing systems used within outbound calling systems, such as disclosed in U.S. Pat. No. 5,247,569 issued Sep. 21, 1993 to a common assignee, and as disclosed in U.S. Pat. No. 5,311,588, issued May 10, 1994, also assigned to a common assignee, which are both hereby incorporated by reference herein, the system is able to ascertain the status of any calling connection with a high degree of certainty.

An important aspect included with determining the status of any calling connection is a capability to ascertain the difference between voice and noise signals received on the telephone line. Referring to FIGS. 4a–4h, there are illustrated example waveforms for the types of signals that may be received over the telephone line by the outbound calling system. The illustrated examples are the frequency vs. time and power vs. time waveforms for a tone signal, a click signal, noise signals and voice signals. It may be readily seen that each signal has its own waveform signature.

FIG. 4a illustrates a tone signal, wherein the frequency of the tone signal is defined by the number of cycles per second. The voltage level defines the volume (or amplitude) of the tone signal.

To calculate the power of the tone signal, the voltage of the signal is integrated over time, resulting in the waveform illustrated in FIG. 4b. As a result, the frequency information of the tone signal is lost. However, the power level of the signal continues to define the volume of the signal.

A click signal (a type of noise signal) has an impulse-shaped waveform, which quickly rises and falls over a short period of time. The peak magnitude of the click signal is much greater than its average magnitude over time. FIG. 4c illustrates a click signal, while FIG. 4d illustrates the power measured within the click signal.

FIG. 4e illustrates a noise signal, which rises and falls rapidly several times during a time period and is varying at random. However, the power of the noise signal, as illustrated in FIG. 4f, is fairly stable. This type of noise is typically referred to as white noise, which is often heard in the background of a telephone conversation occurring over "bad" telephone lines.

A voice signal rises and falls gradually over a period of time, approaching the shape of a sine wave, as illustrated in FIG. 4g. The power variation, illustrated in FIG. 4h, of the voice signal is smooth with a gradual increase and decrease of the signal over time.

Due to the differences between the peak-to-average power ratios of the above-described signals, one method for discerning between these signals is to compare their peak-to-average power ratios to predetermined criteria in order to decide which signal is being received on the telephone line by the call progress system. Such a system and method, which has been disclosed within U.S. Pat. No. 5,311,588, referenced above, is quite effective for determining if a signal is a tone or a click signal. However, though it is effective at discerning between voice and noise signals, the results can be improved upon.

Furthermore, the measuring of peak and average power magnitudes of the incoming signals and the subsequent calculation of the ratios and their comparisons requires a considerable mount of computation time by the call progress system, which is typically implemented within a processor-based computing system. When the call progress system is required to monitor a relatively small number of outgoing calling connections, the aforementioned computations do not considerably inhibit the processor's capability to satisfactorily maintain other processes within the system, and thus, the time required to determine the line status of a calling connection is not that significant in length. However, if the call progress system is loaded with a considerable number of channels to monitor, the previously mentioned computations require a significant amount of the processor's capacity, and the entire calling system is burdened and slowed.

Thus, there is a need for a communications system having an improved system and method for discerning between noise signals and voice signals on a calling connection.

SUMMARY OF THE INVENTION

Thus, it is a primary object of the present invention to provide a system and method for accurately and efficiently discerning between voice signals and noise signals on a calling connection over a telecommunications path within a call progress system.

In the attainment of the primary object, the present invention monitors signals received on the telecommunication path over which an outbound call was initiated or an inbound call received. In a preferred embodiment, the present invention provides a system and method for recognizing a voice signal on a telecommunications path by measuring power magnitudes of a received signal on the telecommunications path over selected increments of time and then determining that the received signal is a voice signal when the measured power magnitudes vary less than a predetermined amount over the selected increments of time.

Power measurements are performed at successive equal increments of time upon a received signal. In one aspect of the present invention, these increments of time are equal to 25 milliseconds. Calculations are then performed on these measured power magnitudes in order to make the determination between voice and noise.

The call progress system measures the power magnitudes within these 25 millisecond increments of time over a 150 millisecond window. In a first calculation, differences in the measured power magnitudes are calculated between the power magnitudes measured in the first 25 millisecond increment and the second 25 millisecond increment and between the third and fourth 25 millisecond increments and between the fifth and sixth 25 millisecond increments. A sum of the absolute values of these three difference calculations are then divided by a sum of the power magnitudes measured within all six of the 25 millisecond increments.

Additionally, a second calculation is performed, which calculates the power difference between the two middle 50 millisecond time periods within the 150 millisecond window. Thus, an absolute value of a sum of the power magnitudes measured within the fourth and fifth 25 millisecond increments are subtracted from an absolute value of a sum of the measured power magnitudes of the second and third 25 millisecond increments, with this result being divided by the absolute value of a sum of the measured power magnitudes within the six 25 millisecond increments. Then, this value is normalized by multiplying it by 1.5.

Thereafter, a third calculation is performed, which calculates the absolute value of a sum of the power measurements within the first three 25 millisecond increments minus a sum of the power measurements within the last three 25 millisecond increments within the monitored 150 millisecond window. This absolute value is likewise divided by the absolute value of a sum of the power measured within the six 25 millisecond increments.

Thereafter, a fourth calculation is performed, which sums the power magnitude measurements within the first two 25 millisecond increments of the 150 millisecond window in order to subtract the sum of the power measurements of the last two 25 millisecond increments within the window. This absolute value is then divided by the sum of the power magnitudes within each of the six time increments, and then the subsequent value is normalized.

Each one of the above four values is a number between 0 and 1, with the value of 0 indicating that there is stability within the signal, and the value of 1 indicating that there is high variation within the signal.

The above four calculated values are then compared, and the highest and lowest values are dropped. The two middle values are then summed and compared to a predetermined value in order to make the determination of whether or not the received signal is comprised of voice signals.

The predetermined value may be computed in a variety of ways. In a preferred embodiment of the present invention, the predetermined value has been previously computed by sampling signals on a predetermined number of messages, or calling connections, within the geographic location where the communications system is to be operated. Through empirical methods, a number, such as 0.5, is predesignated as the threshold number for determining whether or not a received signal is voice. Then, the above described calculations are performed on the sample set of messages and the derived resultant value is compared to the predesignated value of 0.5. The predesignated number is then adjusted using further sample sets of messages, if necessary, until a satisfactory threshold value is achieved, which accurately represents the threshold point for determining whether or not a received signal is comprised of voice signals or noise signals for that particular geographic location.

In one aspect of the present invention, the aforementioned calculations are performed on a plurality of successive 150 millisecond windows in order to provide more reliability within the decision making process. Thus, a determination is made of whether or not the incoming signals are comprised of voice signals when the above calculations result in four consecutive determinations of voice within four consecutive 150 millisecond windows. The process will continue until four consecutive determinations of voice are established.

In another aspect of the present invention, any number or combination of the above four calculations may be implemented within the system for determining whether or not the incoming signals are voice signals. For example, only one of the calculations, or any other number or combination, may be utilized within the system and method of the present invention. These numbers of calculations and combinations may be empirically optimized on a geographical basis.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
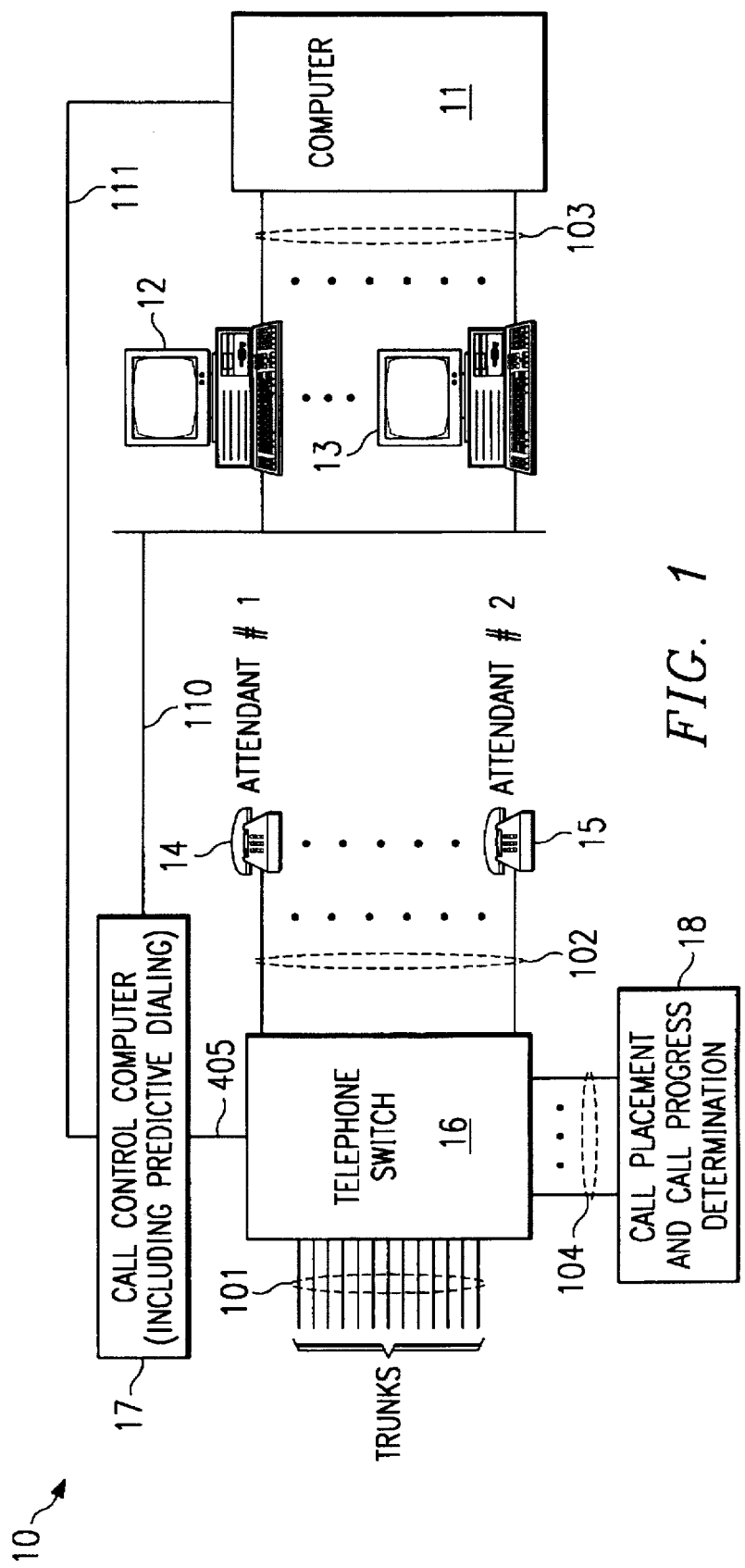
FIG. 1 illustrates a block diagram of an automatic call handling system in which the present invention resides.

Referring to FIG. 1, there is illustrated automatic outbound calling system 10, utilizing a predictive dialing method, which embodies the call progress technique of the present invention for discerning between voice signals and noise signals. Of course, any automatic outbound calling system requiring some form of call progress determination (including inbound systems, as described herein) may utilize the present invention.

Outbound calling system 10, such as disclosed in U.S. Pat. Nos. 5,247,569 and 5,311,588 previously incorporated by reference herein, is coupled through trunks 101 to the public switched network (not shown) through typical telephone switch 16. Telephone switch 16 may be any PBX type device for coupling telecommunications devices through trunks 101 to the public switched network. In the instant case, such telephone devices include telephones 14–15 coupled to switch 16 through lines 102. However, such devices may be facsimile machines, computers, networks, etc.

Call placement and call progress determination system 18 is coupled to each of trunks 101 through telephone switch 16 and lines 104. Also coupled to telephone switch 16 is call control computer 17, which includes a predictive dialing process. Computer 17 is further coupled to database computer 11 and to processor-based systems 12–13, which are also coupled to database computer 11 via lines 103.

Essentially, system 10 performs the automated placement of calls so as to increase the efficiency of the live attendants, or agents (herein labelled Agent #1 and Agent #2), residing at computers 12–13 along with telephones 14–15. A similar system is the subject of U.S. Pat. No. 4,829,563 dated May 9, 1989, in the name of Crockett, et at., which patent is hereby incorporated by reference herein.

Typically, system 10 performs such automated placements of calls by computer 11 communicating over bus 111 with computer 17 and providing computer 17 with a number of telephone numbers, which are to be called throughout the course of a time period. Call control computer 17, utilizing a predictive dialing algorithm in many cases, then places calls through telephone switch 16 by establishing the calls via use of call placement and call progress determination system 18.

System 10 works such that system 18 dials a call over one of trunks 101 and monitors the progress of the call via lines 104 to determine whether the call has been answered, a busy signal has been returned, a no-answer situation exists, etc. Upon determination of an answer, that information is communicated (either through switch 16 or via a direct bus connection (not shown)) to call control computer 17 which in turn monitors which agent is then available. Computer 17 then controls telephone switch 16 to complete a connection from the active trunk 101 over one of lines 102 to a selected agent, such as Agent #1 at station 14. Call control computer 17 then, via bus 110, transmits information to terminal 12 indicating the identity of the called party. At the same time, terminal 12 communicates this information to computer 11 over lines 103. Computer 11 then accesses its database and provides the block of data pertaining to the called party to the appropriate agent operating in this respect in the inquiry mode.

System 10 operates to automatically place calls to called parties and must do so in a manner such that when the calls are answered, an attendant is available. The efficiency with which call control computer 17 performs its function (e.g., predictive dialing) determines the efficiency and the profitability of system 10.

As a consequence, call placement and call progress determination system 18 plays a very important part in the success of system 10. One portion of system 18's function is to determine when a called telephone number has been answered by a called party. Thus, call progress determination system 18 begins functioning immediately upon initiation of an outbound call through telephone switch 16 over one of trunks 101. At that time, it is the function of system 18 to monitor signals on one of trunks 101 and to automatically connect through telephone switch 16 one of the aforementioned agents to an answered call when system 18 determines that the initiated outbound call has actually been answered by a live person. As previously discussed, such a determination is not a simple matter, since noise signals often resemble voice signals. It is an object of the present invention to provide a better technique for discerning between voice signals and noise signals so that an outbound call is not connected to an agent until voice signals from a live person are received over trunk 101.

Alternatively, an inbound call handling system may also utilize the present invention. For example, after the inbound call handling system has received a call, and after some initial transactions or interactions have occurred with the inbound caller, the caller may wish (or may be requested by the system) to record his/her voice. In such a case, the voice detection techniques of the present invention may be used to detect the absence of voice once the caller has stopped speaking, so that the recording of the voice may cease.

Figure 2A:
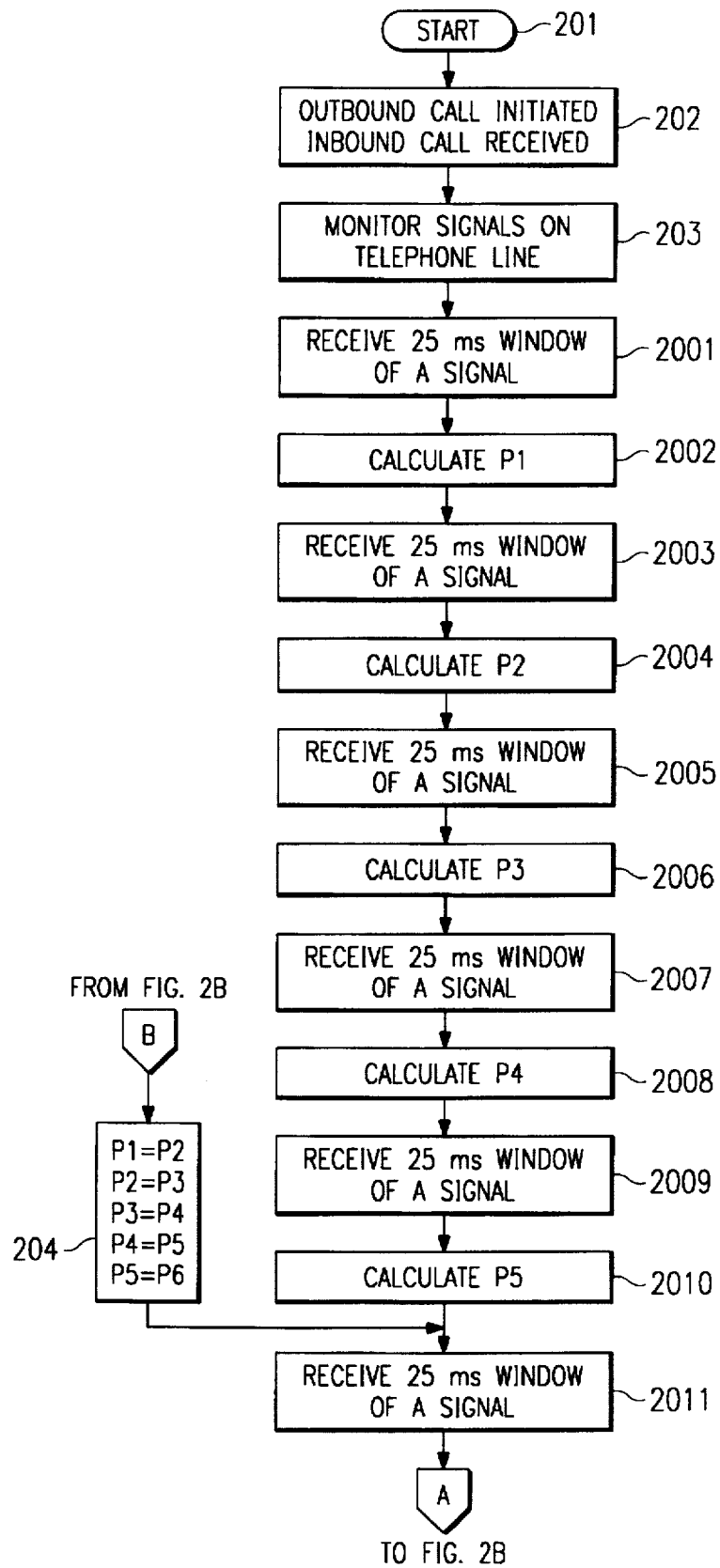
FIG. 2A–2B illustrates a flow diagram of an operation of the present invention.
Figure 2B:
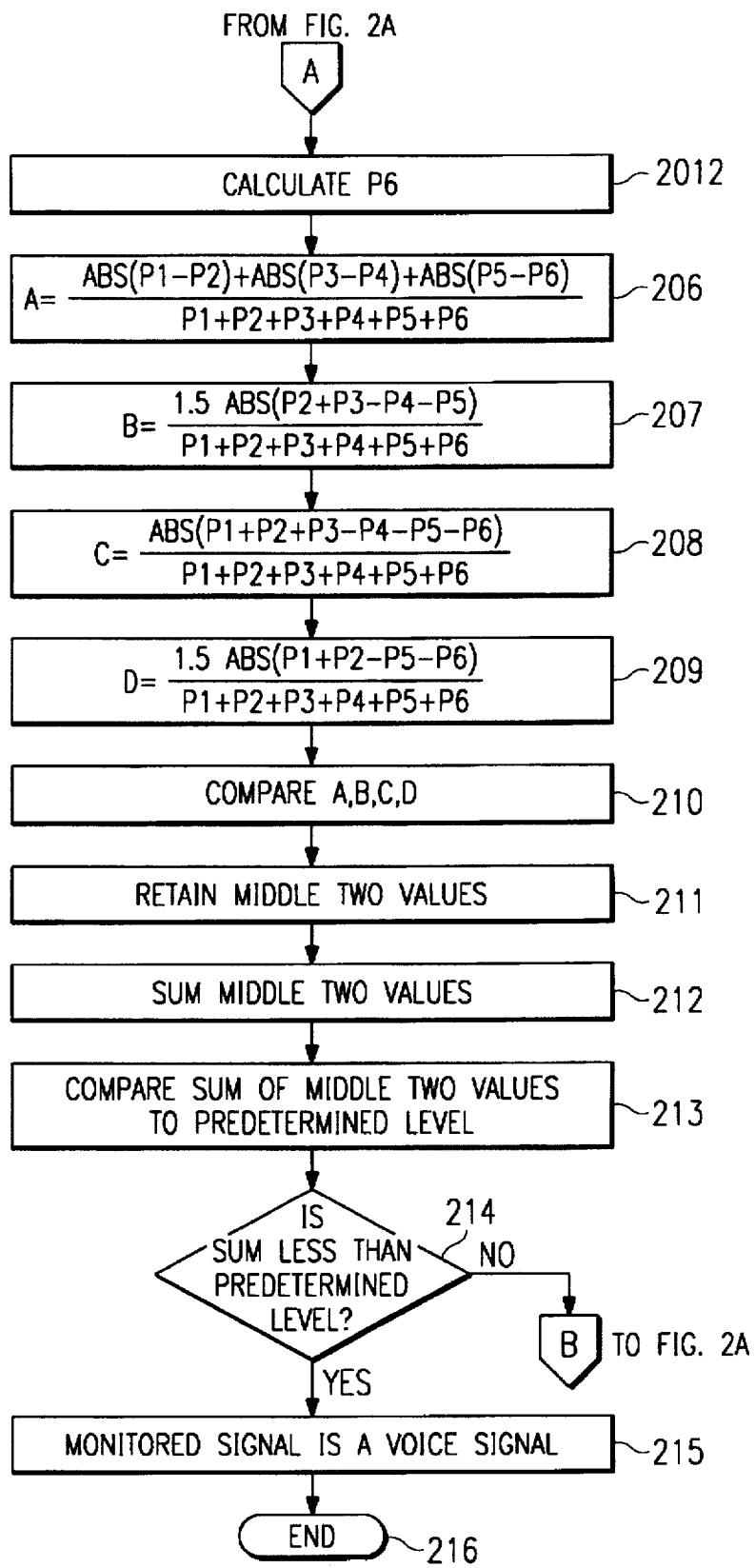

Referring next to FIG. 2, there is illustrated a flow diagram of a preferred operation of the present invention within call progress determination system 18 wherein a determination is made whether or not voice signals have been received on an outbound calling connection. As previously discussed, the predictive dialing algorithm within call control computer 17 has received a group of telephone numbers from database computer 11 to be called through telephone switch 16 over trunks 101.

At this point, system 18 begins operation at step 201 and proceeds to step 202 where an outbound call is initiated by system 18 (or an inbound call received) through telephone switch 16 over thinks 101. Thereafter, at step 203, system 18 monitors signals on the telephone line through which the particular outbound call has been initiated (inbound call received). Next, the process begins an initialization phase, which is performed only once per call. This phase of the process begins at step 2001, wherein a 25 millisecond window of a signal is received by system 18. Thereafter, in step 2002, the power magnitude P1 is measured (calculated) for the received 25 millisecond window. Next, at step 2003, the next 25 millisecond window of the signal is received. Thereafter, at step 2004, the power magnitude P2 of this next received 25 millisecond of signal is measured. Next, at step 2005, the third 25 millisecond window of the signal is received. Then, power magnitude P3 is measured for the 25 millisecond window of signal in step 2006. Thereafter, at step 2007, the next 25 millisecond window of signal is received, and its power magnitude P4 is measured in step 2008. Next, at step 2009, the fifth 25 millisecond window of signal is received. Then, at step 2010, the power magnitude P5 of this fifth 25 millisecond window is measured. Then, in step 2011, the sixth 25 millisecond window of signal is received, and its power magnitude P6 is measured in step 2012.

Thereafter, at step 206, value A is calculated by system 18 using the measured power magnitudes:

$$A = \frac{ABS(P1-P2) + ABS(P3-P4) + ABS(P5-P6)}{P1+P2+P3+P4+P5+P6}$$

(Note that ABS(x) represents the absolute value of x; Pn, for $1 \leq n \leq 6$, represents the power magnitude measured within the nth 25 millisecond increment of a 150 millisecond window.) Value A is basically a measure of the variation in power between the first two 25 millisecond increments (or bins), the second two bins and the third two bins. The absolute values of these variations are then added and normalized (by dividing by the total power measured within the window) to arrive at value A.

In a preferred embodiment of the present invention, the analog signal received on a selected one of trunks 101 is routed within telephone switch 16 through one of lines 104 to system 18, where the signal is converted within a typical analog-to-digital converter (not shown) to a digital signal. The aforementioned power magnitude measurements are performed upon this digital signal by essentially summing the squares of each digital value pertaining to the converted analog signal within each 25 millisecond bin.

Next, at step 207, value B is calculated by system 18 utilizing the measured power magnitudes within the 150 millisecond window:

$$B = \frac{1.5\,ABS(P2+P3-P4-P5)}{P1+P2+P3+P4+P5+P6}$$

Value B is basically a normalized measurement of the variation in power between the two middle 50 millisecond bins within the 150 millisecond window.

Next, at step 208, value C is calculated by system 18 utilizing the same measured power magnitudes within the 150 millisecond window of signal received on the telephone line:

$$C = \frac{ABS(P1 + P2 + P3 - P4 - P5 - P6)}{P1 + P2 + P3 + P4 + P5 + P6}$$

Value C is basically a normalized measurement of the variation in power between the first 75 millisecond increment and the second 75 millisecond increment within the 150 millisecond window.

Thereafter, at step 209, value D is calculated within system 18, again utilizing the same power magnitudes measured within the 150 millisecond window:

$$D = \frac{1.5\,ABS(P1 + P2 - P5 - P6)}{P1 + P2 + P3 + P4 + P5 + P6}$$

Value D is basically the normalized measurement of the power variation between the first 50 millisecond increments and the last 50 millisecond increments within the 150 millisecond window.

System 18 then proceeds to step 210 where values A, B, C and D are compared to each other. Next, at step 211, system 18 retains the two middle values, thus discarding the smallest and largest values of A, B, C and D. Thereafter, at step 212, the two middle values are summed.

At step 213, the sum of the two middle values is compared to a predetermined level that has been previously calibrated for operation of system 10 within the particular geographical area where system 10 has been installed and is utilized. Calculation of this predetermined number is discussed below with respect to FIG. 3.

At step 214, system 18 determines whether or not the sum of the middle two values is less than the predetermined level. If it is not, system 18 returns to step 204, wherein the 25 millisecond window associated with power magnitude P1 is dropped, and essentially, a sliding window is utilized on the previously measured 25 millisecond windows. Thus, the new P1 is equal to the previous P2, etc., to where P5 is equal to the previous P6. Additionally, the next 25 millisecond window after the previous sixth window is received in step 2011, and then its power magnitude is measured in step 2012 to become the new P6.

The process then continues from step 2012 through steps 206–214, as previously described to determine whether or not voice is detected, wherein the process will continue on to step 215. Essentially, if system 18 has determined that a voice signal has not yet been received with respect to the outbound (inbound) telephone call as a result of the power measurements of the received signal within that particular 150 millisecond window, then system 18 repeats the aforementioned process for another 150 millisecond window sample (refer to steps 204, 2011, 2012) of the received signal on the telephone line. This repetition is continued until system 18 perceives that a voice signal is on the telephone line, or until some other process within system 10 has intercepted the telephone line and determined that the line should be disconnected.

As previously noted, if at step 214, system 18 determines that the sum of the two middle values is less than the predetermined level, system 18 proceeds to step 215 to determine that the received signal within the 150 millisecond window, and its respective power measurements, indicates that a voice signal is being received by system 18 over the particular telephone line. The present invention then ends at step 216 so that other processes within computer 17 and system 18 may be performed with respect to the telephone call.

In an alternative embodiment of the present invention, any combination of steps 206–209 may be utilized within system 18 depending upon the desired accuracy of the call progress determination. For example, only value C may be computed within each 150 millisecond window for a determination whether or not the received signal is a voice signal.

In another alternative embodiment of the present invention, any combination of values A, B, C and D may be calculated within successive sliding 150 millisecond windows received by system 18. For example, with respect to the first sliding 150 millisecond window, only values A and B may be calculated, and then within the second received 150 millisecond window, a different combination of the aforementioned values may be calculated to then arrive at the determination of whether or not a voice signal has been received.

Figure 5:
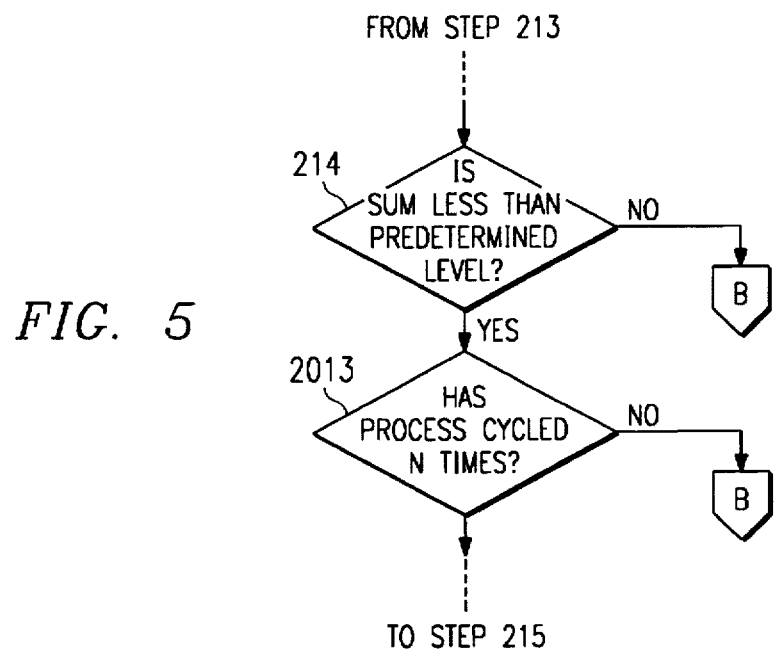
FIG. 5 illustrates alternate steps for the flow diagram illustrated in FIG. 2.

Furthermore, in another alternative embodiment of the present invention, step 215 may be delayed until a specified consecutive number of 150 millisecond windows have been received wherein the sum of the two middle values is less than the predetermined level, in order to provide for more accuracy. For example, referring to FIG. 5, which illustrates a modified portion of the flow diagram of FIG. 2, step 2013 has been added in between steps 214 and 215 to test whether or not a predetermined number of consecutive windows have been cycled through the process illustrated in FIG. 2. If not, the process will return to step 204 to continue through the next window. However, if a predetermined number N of cycles have occurred, the process will then continue on to step 215 as previously described.

Figure 6:
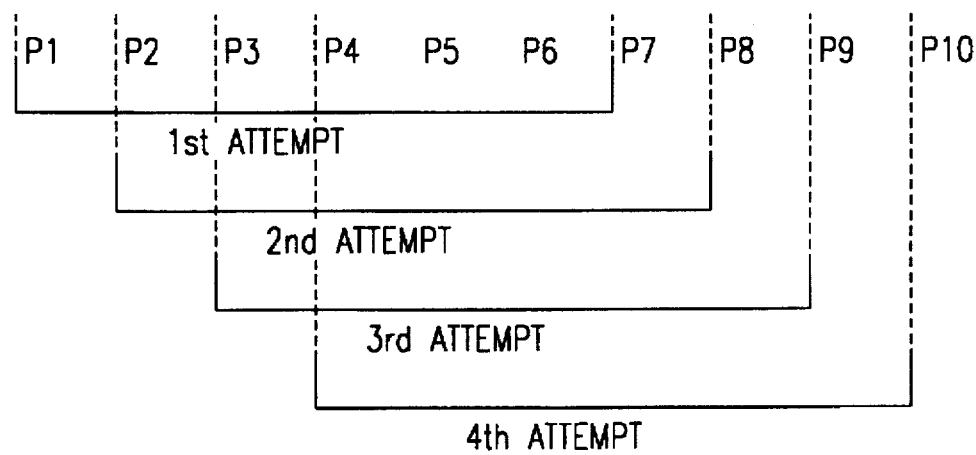
FIG. 6 illustrates a sliding window approach for measuring power magnitudes of a received signal.

FIG. 6 illustrates a situation where four consecutive windows are cycled through the process of the present invention. Of course, this consecutive number may be varied as a design choice. Additionally, this number may be varied to depend upon the quality of the telephone lines utilized within the particular geographical region where the system is used. Such a number may be empirically calculated in order to improve performance.

Returning to FIG. 1, after step 215, system 18 may execute various other processes for determining whether or not the received voice signal is a voice signal originating from a live person or a voice recording on the other end of the telephone line. Once a determination that a live person is on the other end of the telephone line has been made by system 18, the call may be transferred through telephone switch 16 to telephone device 14, for example, so that the call may be processed by Agent #1. Simultaneously, computer 17 will transfer information pertaining to the called party to terminal 12, which will request further information on the called party from computer 11 so that all of this information may be displayed on computer 12 for viewing by Agent #1 while conversing with the called party through telephone device 14.

Figure 3:
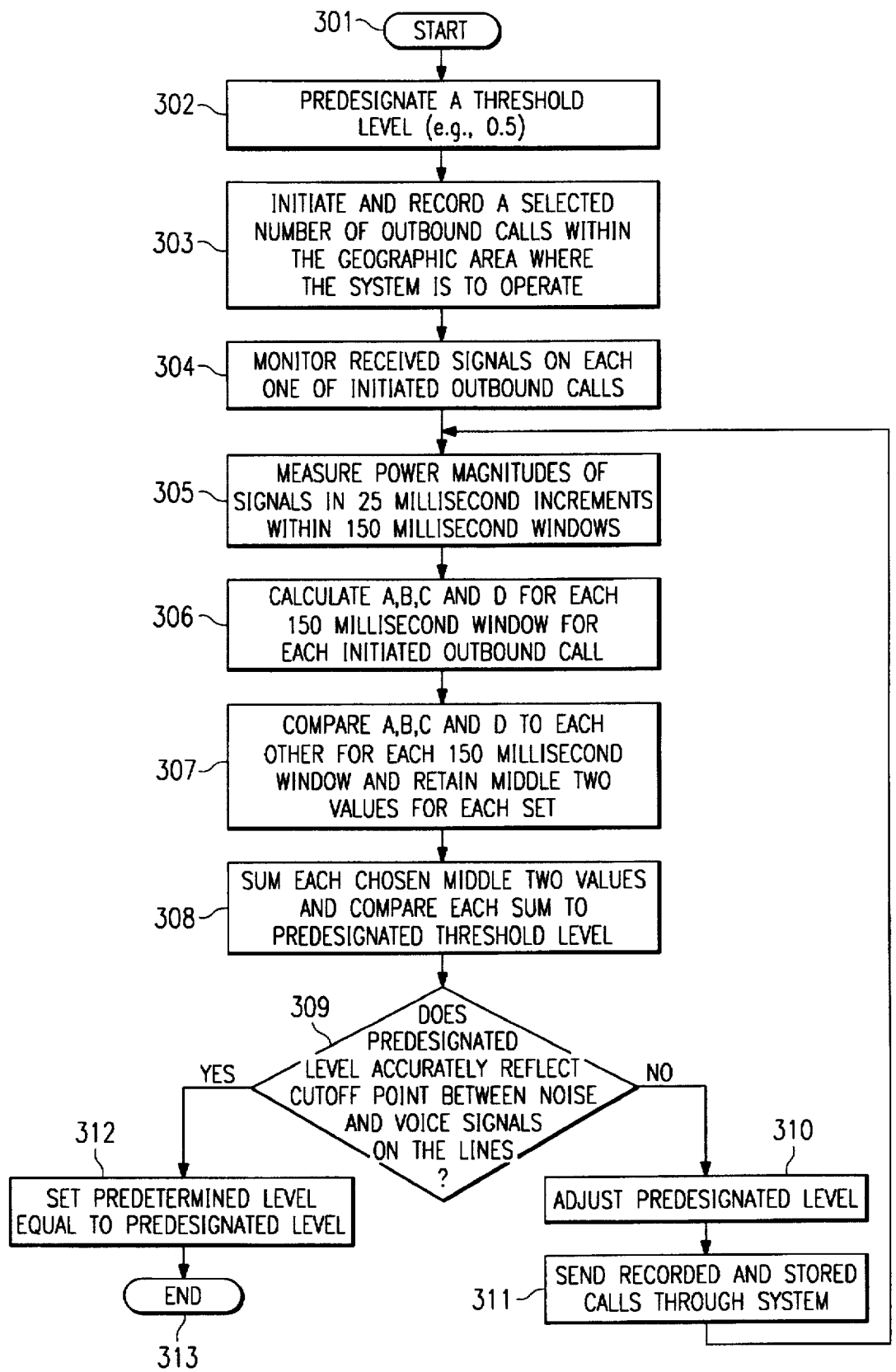
FIG. 3 illustrates a flow diagram of the manner in which a threshold level utilized within the present invention for discriminating between voice signals and noise signals is derived.
Figure 4A:
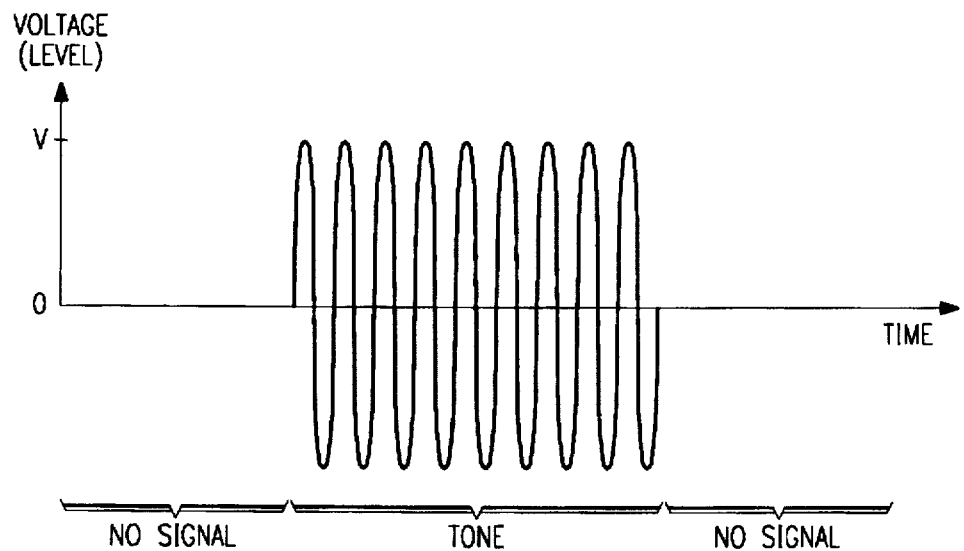
FIGS. 4a–4h illustrate frequency waveforms of signals typically received on a telephone line.
Figure 4B:
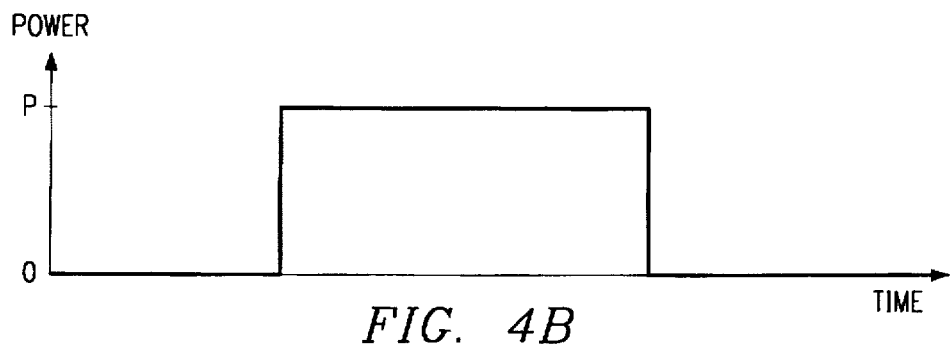
Figure 4C:
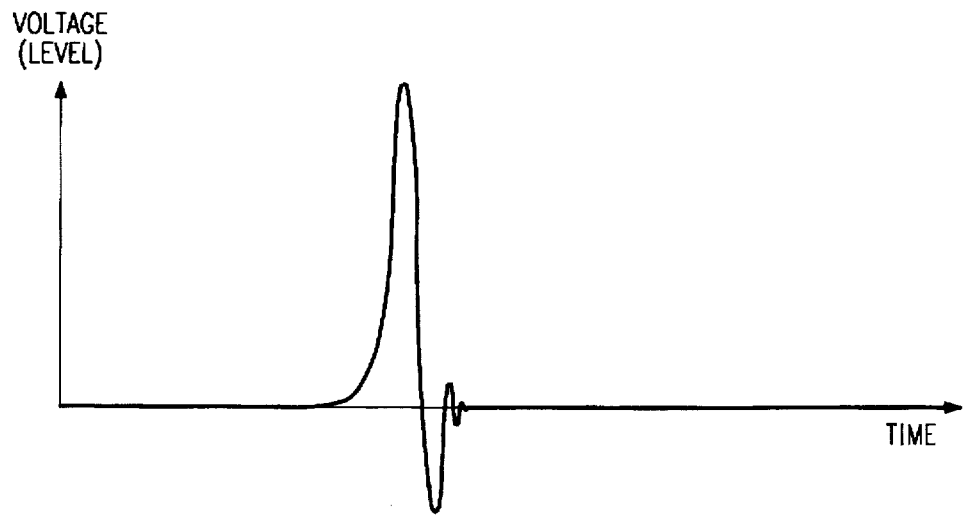
Figure 4D:
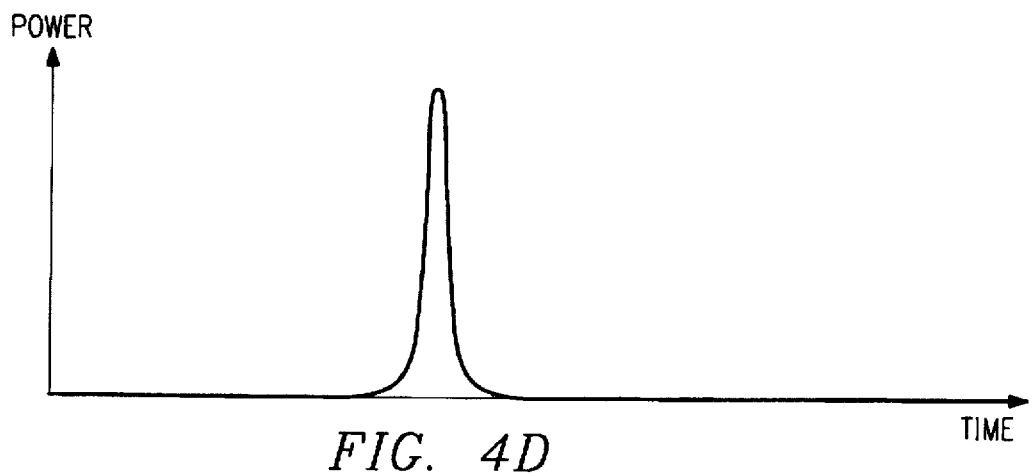
Figure 4E:
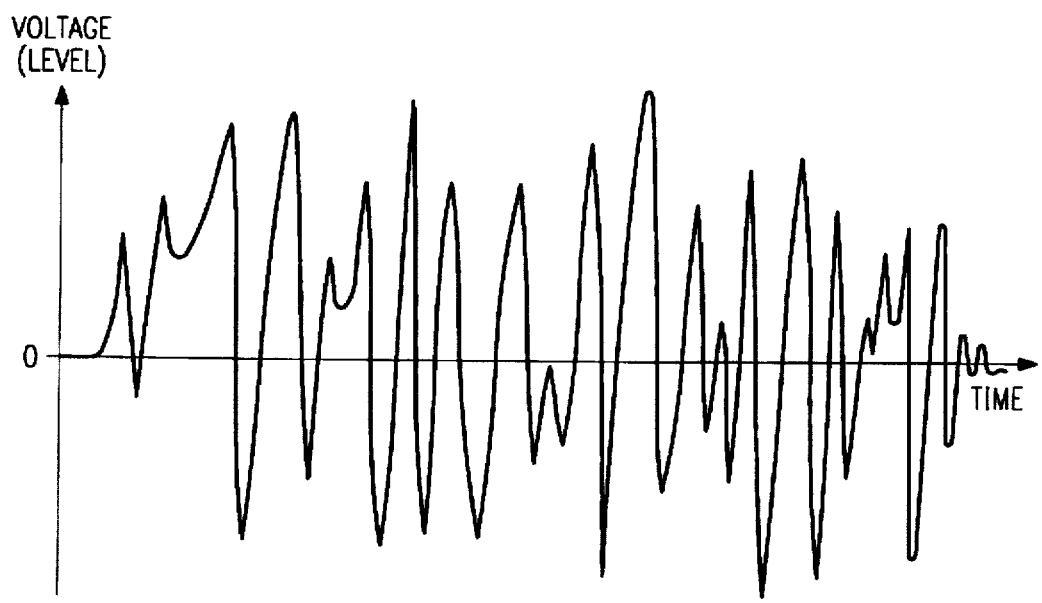
Figure 4F:
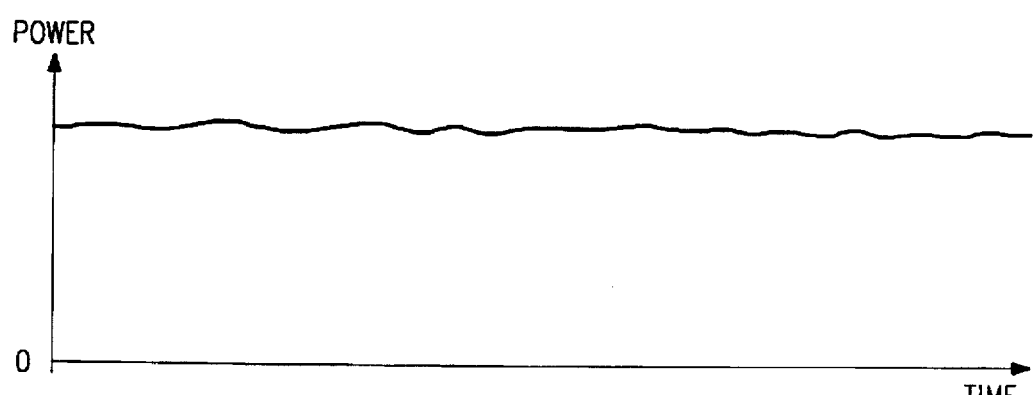
Figure 4G:
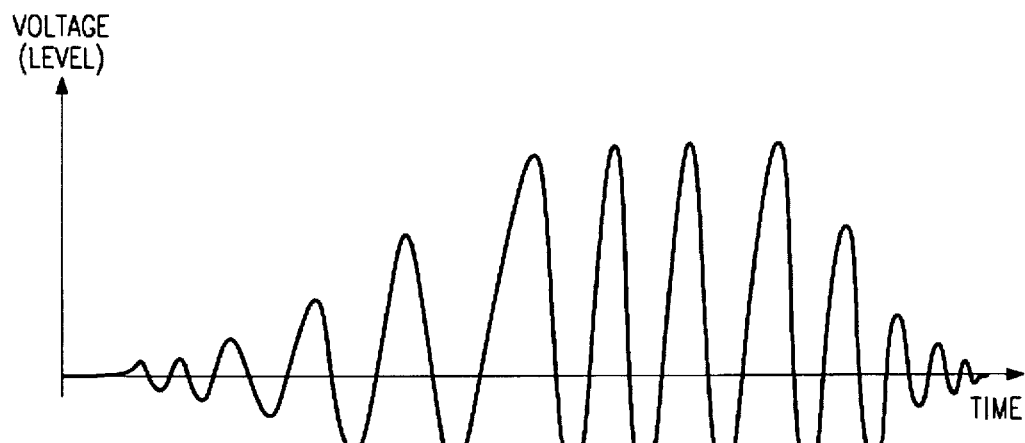
Figure 4H:
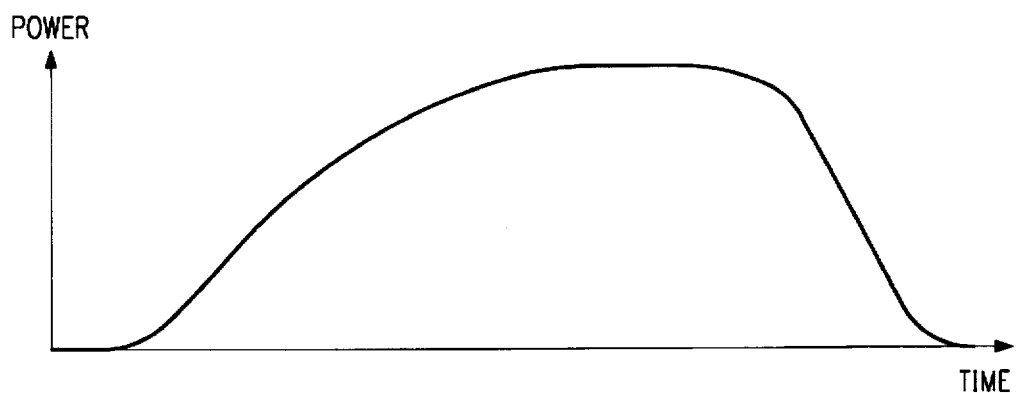

Referring next to FIG. 3, there is illustrated a flow diagram of a preferred method for ascertaining the appropriate threshold level that is to be compared to the sum of the middle two values of A, D, C and D for the determination of whether or not a received signal is a voice signal. It should be noted that due to differences in telephone line qualities and the particular telecommunications systems utilized within a particular geographic area (e.g., a region of the United States, or a particular country), the power magnitudes of signals and noise levels received on a telephone line may vary from one locality to another. Therefore, system 18 may be calibrated to operate in the most efficient manner within a particular geographic location by adjusting the aforementioned threshold level.

System 10 is first installed within the geographic location within which it will permanently operate. The process then begins at step 301, and proceeds to step 302 where a threshold level is predesignated (manually or automatically). For example, the threshold level may be predesignated to equal to a value of 0.5.

Thereafter, in step 303, system 10 initiates a selected number of outbound calls within the geographic area where system 10 is to operate. The selected number of outbound calls initiated is variable as a design choice. System 10, preferably computer 17, records these calls upon their initiation, and stores the recordings, after an analog-to-digital conversion, onto a storage medium (preferably, a hard disk) for further use as explained below.

Next, at step 304, signals received on each of the outbound calls are monitored. At step 305, the power magnitudes of these signals are measured in 25 millisecond increments within 150 millisecond windows as previously described with respect to FIG. 2.

Next, at step 306, values A, B, C and D are calculated in a similar manner as described in steps 206–209 with respect to FIG. 2. Thereafter, at step 307, values A, B, C and D are compared to each other and the middle two values are retained for each outbound call. Next, at step 308, the sums of each set of middle two values are compared to the predesignated threshold level (in this example, 0.5).

At step 309, a determination is made whether or not the predesignated threshold level accurately represents the cut-off point, within this sample set of outbound calls, for assisting system 18 in its determination whether or not a particular signal received on an outbound call is actually a voice signal or is merely noise signals. Essentially, the aforementioned is an experimental testing of whether or not system 18, utilizing the predesignated threshold level, is able to accurately predict whether or not a voice signal has been received on a particular telephone line on which an outbound call has been made.

If system 18 is not accurately making such predictions within a predetermined accuracy rate, the aforementioned predesignated level may be adjusted at step 310 within system 18. Thereafter, at step 311, system 10 retrieves the recorded telephone calls made within step 303 and sends them to system 18, simulating a receipt of signals on actual telephone lines. The process returns to step 305 to again determine whether or not the adjusted predesignated level accurately reflects the threshold point needed for the desired accuracy of the system. This continues until the predesignated level does accurately reflect the aforementioned cutoff point.

The process will then move to step 312 to set the predetermined level equal to the predesignated level (adjusted or not) for use by system 18 during normal operation of system 10. Thereafter, this particular process ends at step 313.

The present invention has been generally described with respect to the placement of outbound telephone calls by an automatic calling system. However, the concepts of the present invention may also be utilized within an inbound calling system, or a combination of an inbound and outbound calling system.

Within an inbound calling system, after a call is accepted and received, and after some initial transactions between the caller and the system, the caller may wish, or be directed, to record his/her voice. In this case, the recording of the voice will commence and continue until a detection of the absence of voice occurs. Such a detection of the absence of voice may be accomplished by the present invention.

Figure 7:
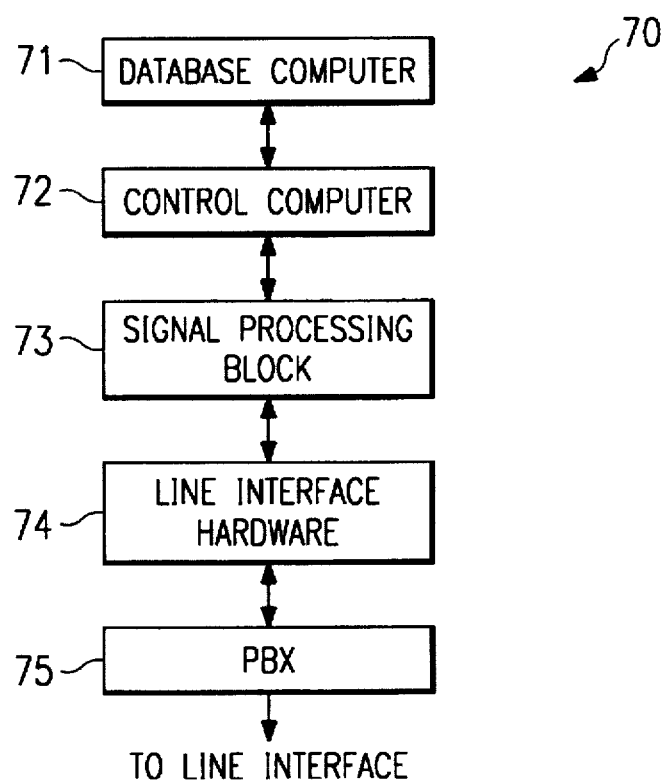
FIG. 7 illustrates a block diagram of an inbound calling system utilizing the present invention.

Referring next to FIG. 7, there is illustrated a block diagram of inbound calling system 70, which may utilize the present invention.

The customer records may be stored within database computer 71 and accessible by control computer 72. Control computer 72 is coupled to signal processing block 73 for processing the received signals on the telephone lines. Signal processing block 73 encloses the present invention as described above. To receive telephone calls, signals processing block 73 is coupled to PBX 75 via line interface hardware 74. PBX 75, which may be a local switch, or which may be replaced by a Centrex switch, is coupled to the telephone lines to the public switched network.

Although the present invention and its advantages have been described in detail, it should be understood that that various changes, substitutions and alterations can be made herein without departing from the spirit and scope of the invention as defined by the appended claims.

What is claimed is:

1. A system for recognizing a voice signal within an outbound calling system, said recognizing system comprising:

calling means for attempting outbound call placement over a telephone line coupled to said calling system; and call progress means, coupled to said calling means, for monitoring signals received on said telephone line, said call progress means including:

means for measuring power magnitudes of a received signal on said telephone line over successive increments of time; and means for determining if said received signal is a voice signal, wherein said received signal is determined to be said voice signal if a difference between said measured power magnitudes is less than a predetermined value;

wherein said predetermined value is empirically derived by comparing variations in power magnitudes of received signals over successive time periods within a plurality of sampled outbound calling connections with a trial value, and then adjusting said trial value until said recognizing system is able to determine if a received signal is a voice signal within a specified degree of accuracy.

2. The recognizing system as recited in claim 1 wherein said successive increments of time are 25 milliseconds each in length.

3. The recognizing system as recited in claim 1 wherein said successive increments of time are 50 milliseconds each in length.

4. The recognizing system as recited in claim 1 wherein said outbound calling system is implemented within a processor-based system which includes:

a processor;

display device coupled to said processor; and a memory device coupled to said processor.

5. The recognizing system as recited in claim 1 wherein said outbound calling system is coupled to said telephone line through a telecommunications switch.

6. The recognizing system as recited in claim 1 wherein said outbound calling system is integral with an inbound call handling system.

7. A method for recognizing a voice signal on a telecommunications path, said method comprising the steps of:

measuring power magnitudes of a received signal on said telecommunications path over selected increments of time; and determining that said received signal is a voice signal when said measured power magnitudes vary less than a predetermined amount over said selected increments of time, wherein the step of determining includes:

calculating differences in said measured power magnitudes between a first and a second successive time increments, between a third and a fourth successive time increments, and between a fifth and a sixth successive time increments;

dividing a sum of the absolute values of said calculated differences by a sum of said measured power magnitudes; and comparing a normalized value of said divided sums to a predetermined value, wherein said received signal is determined to be said voice signal if said normalized value is less than said predetermined value.

8. The method as recited in claim 7 wherein said method is implemented within a processor-based system which includes:

a processor;

display device coupled to said processor; and a memory device coupled to said processor.

9. The method as recited in claim 7 wherein said method is implemented within an outbound calling system which is coupled to said telecommunications path through a telecommunications switch.

10. The method as recited in claim 9 wherein said outbound calling system is integral with an inbound call handling system.

11. A method for recognizing a voice signal on a telecommunications path, said method comprises the steps of:

measuring power magnitudes of a received signal on said telecommunications path over selected increments of time; and determining that said received signal is a voice signal when said measured power magnitudes vary less than a predetermined amount over said selected increments of time, wherein the step of determining includes:

calculating a sum of said power magnitudes measured in a second and a third successive time increments, and a sum of said power magnitudes measured in a fourth and a fifth successive time increments;

calculating a difference between said sums; dividing 1.5 times an absolute value of said calculated difference by a sum of said measured power magnitudes to produce a normalized value; and comparing said normalized value to a predetermined value, wherein said received signal is determined to be said voice signal if said normalized value is less than said predetermined value.

12. A method for recognizing a voice signal on a telecommunications path, said method comprises the steps of:

measuring power magnitudes of a received signal on said telecommunications path over selected increments of time; and determining that said received signal is a voice signal when said measured power magnitudes vary less than a predetermined amount over said selected increments of time, wherein the step of determining includes:

calculating a sum of said power magnitudes measured in a first, a second and a third successive time increments, and a sum of said power magnitudes measured in a fourth, a fifth and a sixth successive time increments;

calculating a difference between said sums; dividing an absolute value of said calculated difference by a sum of said measured power magnitudes to produce a normalized value; and comparing said normalized value to a predetermined value, wherein said received signal is determined to be said voice signal if said normalized value is less than said predetermined value.

13. A method for recognizing a voice signal on a telecommunications path, said method comprises the steps of:

measuring power magnitudes of a received signal on said telecommunications path over selected increments of time; and determining that said received signal is a voice signal when said measured power magnitudes vary less than a predetermined amount over said selected increments of time, wherein the step of determining includes:

calculating a sum of said power magnitudes measured in a first and a second successive time increments, and a sum of said power magnitudes measured in a fifth and a sixth successive time increments;

calculating a difference between said sums;

dividing 1.5 times an absolute value of said calculated difference by a sum of said measured power magnitudes to produce a normalized value; and comparing said normalized value to a predetermined value, wherein said received signal is determined to be said voice signal if said normalized value is less than said predetermined value.

14. A circuit for determining call progress in a communications system, said circuit comprising:

means for measuring power magnitudes of selected portions of an incoming signal on a telecommunications path coupled to said system;

means for calculating variations in said measured power magnitudes between said selected portions; and means for determining that said incoming signal is a voice signal when said variations are lower than a predetermined level, wherein the means for determining includes:

means for calculating difference in said measured power magnitudes between a first and a second successive time increments, between a third and a fourth successive time increments, and between a fifth and a sixth successive time increments; and means for dividing a sum of the absolute values of said calculated differences by a sum of said measured power magnitudes, wherein said determining means comprises:

means for comparing a normalized value of said divided sums to said predetermined level, wherein said incoming signal is determined to be said voice signal if said normalized value is less than said predetermined level.

15. The circuit as recited in claim 14 wherein said selected portions are six successive time increments during which said incoming signal is received by said circuit.

16. The circuit as recited in claim 14 wherein said variations are calculated over consecutive pairs of said portions.

17. A circuit for determining call progress in a communications system, said circuit comprising:

means for measuring power magnitudes of selected portions of an incoming signal on a telecommunications path coupled to said system;

means for calculating variations in said measured power magnitudes between said selected portions; and means for determining that said incoming signal is a voice signal when said variations are lower than a predetermined level, wherein the means for determining includes:

means for calculating difference in said power magnitudes measured in a second and a third successive time increments, and a sum of said power magnitudes measured in a fourth and a fifth successive time increments;

means for calculating a difference between said sums;

means for dividing 1.5 times an absolute values of said calculated difference by a sum of said measured power magnitudes to produce a normalized value, wherein said determining means comprises:

means for comparing said normalized value of said divided sums to said predetermined level, wherein said incoming signal is determined to be said voice signal if said normalized value is less than said predetermined level.

18. A circuit for determining call progress in a communications system, said circuit comprising:

means for measuring power magnitudes of selected portions of an incoming signal on a telecommunications path coupled to said system;

means for calculating variations in said measured power magnitudes between said selected portions; and means for determining that said incoming signal is a voice signal when said variations are lower than a predetermined level, wherein the means for determining includes:

means for calculating a sum of said measured power magnitudes measured in a first, a second and a third successive time increments, and a sum of said power magnitudes measured in a fourth, a fifth and a sixth successive time increments;

means for calculating a difference between said sums; and means for dividing an absolute value of said calculated difference by a sum of said measured power magnitudes to produce a normalized value, and wherein said determining means comprises:

means for comparing said normalized value to predetermined level, wherein said incoming signal is determined to be said voice signal if said normalized value is less than said predetermined level.

19. A circuit for determining call progress in a communications system, said circuit comprising:

means for measuring power magnitudes of selected portions of an incoming signal on a telecommunications path coupled to said system;

means for calculating variations in said measured power magnitudes between said selected portions; and means for determining that said incoming signal is a voice signal when said variations are lower than a predetermined level, wherein the means for determining includes:

means for calculating a sum of said power magnitudes measured in a first and a second successive time increments, and a sum of said power magnitudes measured in a fifth and a sixth successive time increments;

means for calculating a difference between said sums; and means for dividing 1.5 times an absolute value of said calculated difference by a sum of said measured power magnitudes to produce a normalized value, and wherein said determining means comprises:

means for comparing said normalized value to said predetermined level, wherein said incoming signal is determined to be said voice signal if said normalized is less than said predetermined level.

20. A system for determining if a voice signal has been received on a telecommunications path within a communications system, said determining system comprising:

means for measuring power magnitudes of a signal received over six successive time increments on said telecommunications path coupled to said communications system;

means for calculating differences in said measured power magnitudes between the first and second successive time increments, between the third and fourth successive time increments, and between the fifth and sixth successive time increments;

means for dividing a sum of the absolute values of said calculated differences by a sum of said measured power magnitudes to produce a normalized first power variation parameter;

means for calculating a sum of said power magnitudes measured in the second and third successive time increments, and a sum of said power magnitudes measured in the fourth and fifth successive time increments;

means for calculating a difference between said last two mentioned sums;

means for dividing 1.5 times an absolute value of said calculated difference by a sum of said measured power magnitudes to produce a normalized second power variation parameter;

means for calculating a sum of said power magnitudes measured in the first, second and third successive time increments, and a sum of said power magnitudes measured in the fourth, fifth and sixth successive time increments;

means for calculating a difference between said last two mentioned sums;

means for dividing an absolute value of said last mentioned calculated difference by a sum of said measured power magnitudes to produce a normalized third power variation parameter;

means for calculating a sum of said power magnitudes measured in the first and second successive time increments, and a sum of said power magnitudes measured in the fifth and sixth successive time increments;

means for calculating a difference between said last two mentioned sums;

means for dividing 5 times an absolute value of said last mentioned calculated difference by a sum of said measured power magnitudes to produce a normalized fourth power variation parameter; and means for comparing a sum of selected ones of said normalized parameters to a predetermined level, wherein said signal is determined to be said voice signal when said sum of selected ones of said normalized parameters is less than said predetermined level.

21. A method for discriminating between a voice signal and a noise signal on a telecommunications path, said method comprising the steps of:

measuring power magnitudes of a signal received over six successive time increments on said telecommunications path coupled to said system;

calculating differences in said measured power magnitudes between the first and second successive time increments, between the third and fourth successive time increments, and between the fifth and sixth successive time increments;

dividing a sum of the absolute values of said calculated differences by a sum of said measured power magnitudes to produce a normalized first power variation parameter;

calculating a sum of said power magnitudes measured in the second and third successive time increments, and a sum of said power magnitudes measured in the fourth and fifth successive time increments;

calculating a difference between said last two mentioned sums;

dividing 1.5 times an absolute value of said calculated difference by a sum of said measured power magnitudes to produce a normalized second power variation parameter;

calculating a sum of said power magnitudes measured in the first, second and third successive time increments, and a sum of said power magnitudes measured in the fourth, fifth and sixth successive time increments;

calculating a difference between said last two mentioned sums;

dividing an absolute value of said last mentioned calculated difference by a sum of said measured power magnitudes to produce a normalized third power variation parameter;

calculating a sum of said power magnitudes measured in the first and second successive time increments, and a sum of said power magnitudes measured in the fifth and sixth successive time increments;

calculating a difference between said last two mentioned sums;

dividing 1.5 times an absolute value of said last mentioned calculated difference by a sum of said measured power magnitudes to produce a normalized fourth power variation parameter; and comparing a sum of selected ones of said normalized parameters to a predetermined level, wherein said signal is determined to be said voice signal when said sum of selected ones of said normalized parameters is less than said predetermined level.

\* \* \* \* \*